US006819529B2

(12) United States Patent
Ooami et al.

(10) Patent No.: US 6,819,529 B2
(45) Date of Patent: Nov. 16, 2004

(54) HEAD DRUM DEVICE WITH CARBON-CONTAINING SYNTHETIC RESIN UPPER DRUM AND LARGER DIAMETER INTERMEDIATE DRUM

(75) Inventors: Tadashi Ooami, Tokyo (JP); Junya Endo, Tokyo (JP); Masanori Maehara, Kanagawa (JP); Masahiro Kiko, Chiba (JP); Tamami Mishiro, Kanagawa (JP); Kentaro Shingai, Tokyo (JP)

(73) Assignee: Sony Corporation (JP)

( * ) Notice: Subject to any disclaimer, the term of this patent is extended or adjusted under 35 U.S.C. 154(b) by 87 days.

(21) Appl. No.: 10/181,728

(22) PCT Filed: Dec. 13, 2001

(86) PCT No.: PCT/JP01/10945

§ 371 (c)(1),
(2), (4) Date: Jul. 22, 2002

(87) PCT Pub. No.: WO02/49014

PCT Pub. Date: Jun. 20, 2002

(65) Prior Publication Data

US 2003/0002224 A1 Jan. 2, 2003

(30) Foreign Application Priority Data

Dec. 13, 2000 (JP) .................................... P2000-379023

(51) Int. Cl.⁷ .............................. G11B 15/61; G11B 5/52
(52) U.S. Cl. .................. 360/271.8; 360/84; 360/130.24
(58) Field of Search ........................... 360/271.1, 271.8, 360/130.22, 130.23, 130.24, 84

(56) References Cited

U.S. PATENT DOCUMENTS

| 4,366,516 A | * 12/1982 | Ogata et al. ............ 360/130.24 |
| 6,411,465 B1 | * 6/2002 | Obata et al. ............ 360/130.24 |

FOREIGN PATENT DOCUMENTS

| DE | 19845120 A1 | * 4/1999 | ............ G11B/15/61 |
| EP | 1037200 A2 | * 9/2000 | ............ G11B/5/53 |
| JP | 62052755 A | * 3/1987 | ............ G11B/15/61 |
| JP | 5-314599 | 11/1993 | |
| JP | 05342710 A | * 12/1993 | ............ G11B/15/61 |
| JP | 6-36248 | 2/1994 | |
| JP | 06259844 A | * 9/1994 | ............ G11B/15/61 |
| JP | 08212633 A | * 8/1996 | ............ G11B/15/61 |
| JP | 09111037 A | * 4/1997 | ............ G11B/15/61 |
| JP | 10162455 A | * 6/1998 | ............ G11B/15/61 |
| JP | 10172206 A | * 6/1998 | ............ G11B/15/61 |
| JP | 10-340504 | 12/1998 | |
| JP | 2000-215560 | 8/2000 | |

* cited by examiner

*Primary Examiner*—Craig A. Renner
(74) *Attorney, Agent, or Firm*—Rader, Fishman & Grauer PLLC; Ronald P. Kananen

(57) ABSTRACT

A head drum device of the present invention prevents a magnetic tape (2) from clinging to the head drum device (3) due to electrostatic charge by using a carbon-containing synthetic resin as the material of an upper drum (33) in order to reduce the manufacturing cost for the upper drum. Also, setting the outside diameter of the upper drum (33) smaller than that of an intermediate drum (32) eliminates the need for a high-level of manufacturing precision in the manufacture of the upper drum (33). Thus, it is possible to reduce the manufacturing cost for the upper drum (33).

10 Claims, 4 Drawing Sheets

HEAD DRUM DEVICE WITH CARBON-CONTAINING SYNTHETIC RESIN UPPER DRUM AND LARGER DIAMETER INTERMEDIATE DRUM

TECHNICAL FIELD

The present invention relates to a head drum device for performing either or both of writing and reading of a signal to and from a magnetic tape and to a magnetic recording/playback apparatus, including the head drum device. More particularly, the present invention is directed to a head drum device having a three-layered structure in which an intermediate drum is rotatable, and also to a magnetic recording/playback apparatus including the head drum device.

BACKGROUND ART

In recent years, video tape recorders have come into widespread use as magnetic recording/playback apparatuses using magnetic tape as a recording medium. In video tape recorders, a helical scan method, in which recording or playback of a signal is performed by helically winding a magnetic tape around a head drum device, which is provided with a rotatable magnetic head on its circumference, is commonly used. The head drum device used in such video tape recorders is generally of two types: one having a two-layered structure including a fixed lower drum and a rotatable upper drum having a magnetic head; the other having a three-layered structure including a fixed lower drum, a rotatable intermediate drum having a magnetic head, and a fixed upper drum.

FIG. 1 illustrates an example of the configuration of a conventional three-layered head drum device.

FIG. 1 is a side view of a conventional head drum device 40 having a three-layered structure. The head drum device 40 includes a fixed lower drum 31, an intermediate drum 32 rotatable coaxially with the lower drum 31, and an upper drum 43 fixed coaxially with the intermediate drum 32. The lower drum 31 is provided with a lead 31a around its circumference for assisting the helically wound magnetic tape 2 to travel. A motor mechanism and associated parts for rotating and driving the intermediate drum 32 are contained within the lower drum 31. On the other hand, on the circumference of the intermediate drum 32, magnetic heads 32a for writing or reading a signal to and from the magnetic tape 2 are mounted. In practice, a plurality (two or four) of magnetic heads 32a is usually mounted. A rotary transformer or the like serving as a signal transmission path between the magnetic head 32a and an external device is accommodated within the upper drum 43.

While a recording or playback operation is performed on the magnetic tape 2 in such a head drum device 40, as shown in FIG. 1, the magnetic tape 2 is guided by the lead 31a and travels while being wound around the circumference of the head drum device 40 at a predetermined angle. At this time, the intermediate drum 32 is rotated and the magnetic head 32a scans the magnetic tape 2 at an angle, thus performing writing and reading of signals. The upper drum 43 also serves to prevent the traveling magnetic tape 2 from being displaced upwardly to cover the head drum device 40.

In the three-layered head drum device 40, as shown in FIG. 1, the axial length of the rotatable intermediate drum 32 is smaller than the width of the magnetic tape 2, and thereby the magnetic tape 2 is wound around three layers, that is, the lower drum 31, the intermediate drum 32, and the upper drum 43. In contrast, in a head drum device having a two-layered structure including a fixed lower drum and a rotatable upper drum, the axial length of the upper drum is substantially equal to the width of the magnetic tape 2. Such a two-layered head drum device may be provided with a tape guide above the upper drum to prevent the magnetic tape 2 from covering the upper drum, thus often having an apparent three-layered structure. However, the structure of this type also is called a two-layered structure here. On the other hand, the structure in which the axial length of the intermediate drum 32 is smaller than the width of the magnetic tape 2 is called a three-layered structure.

A specific example of the head drum device 40 having a three-layered structure is shown in Japanese Unexamined Patent Application Publication No. 10-340504 which discloses a head drum device with good contact characteristics between the magnetic tape 2 and the magnetic head 32a. In the head drum device 40, rotating the intermediate drum 32 at high speed while a recording or playback operation is performed causes air to be sucked in by the force of rotation to form an air film between the outer peripheral surface and the magnetic tape 2. This air film allows the magnetic tape 2 to travel smoothly. However, this air film tends to have a thickness distribution such that it is thicker at an entry side of the magnetic tape 2 and thinner at an exit side thereof. In such a case, the contact pressure between the magnetic tape 2 and the magnetic head 32a is not uniform, so that accurate writing and reading of a signal to and from the magnetic tape are prevented. On the other hand, in the above-mentioned publication, such a problem is solved by bonding a belt-like metallic thin film on the lower drum 31 on the side where the magnetic tape 2 exits to form a projection.

In the head drum device 40 having a three-layered structure, in the course of using a tape cassette that feeds the magnetic tape 2, for example, the magnetic tape 2 may be charged with static electricity, so that the magnetic tape 2 is attracted to the head drum device 40 and clings to it when this tape cassette is loaded. If the magnetic tape 2 travels in such a condition, a sufficient air film cannot be generated between the outer peripheral surface of the head drum device 40 and the magnetic tape 2, which may cause the magnetic tape 2 to be damaged. Particularly, in the head drum device 40 having a three-layered structure, as described above, since the axial length of the circumference of the rotatable intermediate drum 32 is small, a sufficient air film fails to be generated when the magnetic tape 2 travels. Accordingly, the magnetic tape 2 is prone to cling to the head drum device 40.

Therefore, the conventional head drum device 40 having a three-layered structure has prevented electrostatic charge by using a non-magnetic metal, such as an aluminum alloy or a copper alloy, as the material of the upper drum 43. Further, in the conventional head drum device 40 with a three-layered structure, the intermediate drum 32 has been formed in such a manner that its outside diameter is equal to that of the upper drum 43, and the friction resistance has been restricted by making the surface on which the magnetic tape 2 travels smooth. Also, in order to prevent the magnetic tape 2 from being damaged when it is in contact with the outer peripheral surface of the upper drum 43, the surface of the upper drum 43 has been manufactured using the metallic material mentioned above formed with a precision of ±2 μm. However, since manufacture of the upper drum 43 described above requires expensive materials, processing, equipment, and so on, use of a synthetic resin material whose cost is relatively low has been discussed.

However, the upper drum 43 made of a synthetic resin has high resistance, so that static electricity is likely to be charged, and therefore the magnetic tape 2 is prone to cling to the upper drum. Further, the manufacturing precision of the surface dimensions is largely reduced in injection molding of synthetic resin material compared with that of metallic material. Accordingly, since further reduction of the outside diameter by machining is necessary in order to obtain a manufacturing precision falling within the range of ±2 μm that is required when manufacturing the upper drum 43, it is impossible to reduce the manufacturing costs.

Furthermore, in a magnetic recording/playback apparatus including the head drum device 40, when any stains or dust are attached on the outer peripheral surface of the upper drum 43, the surface of the magnetic tape 2 may be damaged. Thus, actions such as mounting parts for removing such stains or dust, managing the manufacturing process so as to prevent such stains or dust from being attached, cleaning, and so on have been required during the manufacturing process. As a result, the manufacturing costs have increased due to the increased number of manufacturing processes, additional equipment, and material costs for chemical agents, such as alcohol, used for cleaning, which are necessary for such actions.

The present invention is provided in order to solve such problems, and an object of the present invention is to provide a head drum device having a reduced manufacturing cost for the upper drum.

Another object of the present invention is to provide a magnetic recording/playback apparatus provided with a head drum device having a reduced manufacturing cost for the upper drum.

DISCLOSURE OF INVENTION

In order to solve the problems described above, the present invention provides, in a head drum device for performing either or both of writing and reading of a signal to and from a magnetic tape, the head drum device is characterized by comprising: a fixed lower drum having a lead for helically guiding the magnetic tape; an intermediate drum having a magnetic head on its outer peripheral surface, which is rotated and supported coaxially with the lower drum and is formed in such a manner that the axial length of the outer peripheral surface is smaller than the width of the magnetic tape; and an upper drum made of a synthetic resin containing carbon, which is fixed and supported coaxially with the intermediate drum.

In such a head drum device, use of carbon-containing synthetic resin as the material of the upper drum can prevent the magnetic tape from clinging to the head drum device due to electrostatic charge. Also, setting the outside diameter of the upper drum smaller than that of the intermediate drum can eliminate the need for a high-level of manufacturing precision in the manufacture of the upper drum. Thus, it is possible to reduce the manufacturing cost for the upper drum.

Also, the present invention provides, in a magnetic recording/playback apparatus for performing either or both recording and playback of a signal on a magnetic tape, the magnetic recording/playback apparatus is characterized by having a head drum device comprising: a fixed lower drum having a lead for helically guiding the magnetic tape; an intermediate drum having a magnetic head on its outer peripheral surface, which is rotated and supported coaxially with the lower drum and is formed in such a manner that the axial length of the outer peripheral surface is smaller than the width of the magnetic tape; and an upper drum made of a synthetic resin containing carbon, which is fixed and supported coaxially with the intermediate drum.

In such a magnetic recording/playback apparatus, use of carbon-containing synthetic resin as the material of the upper drum of the head drum device can prevent the magnetic tape from clinging to the head drum device due to electrostatic charge. Also, setting the outside diameter of the upper drum smaller than that of the intermediate drum can eliminate the need for a high-level of manufacturing precision in the manufacture of the upper drum. Thus, it is possible to reduce the manufacturing cost for the upper drum.

BEST MODE FOR CARRYING OUT THE INVENTION

Figure 3:
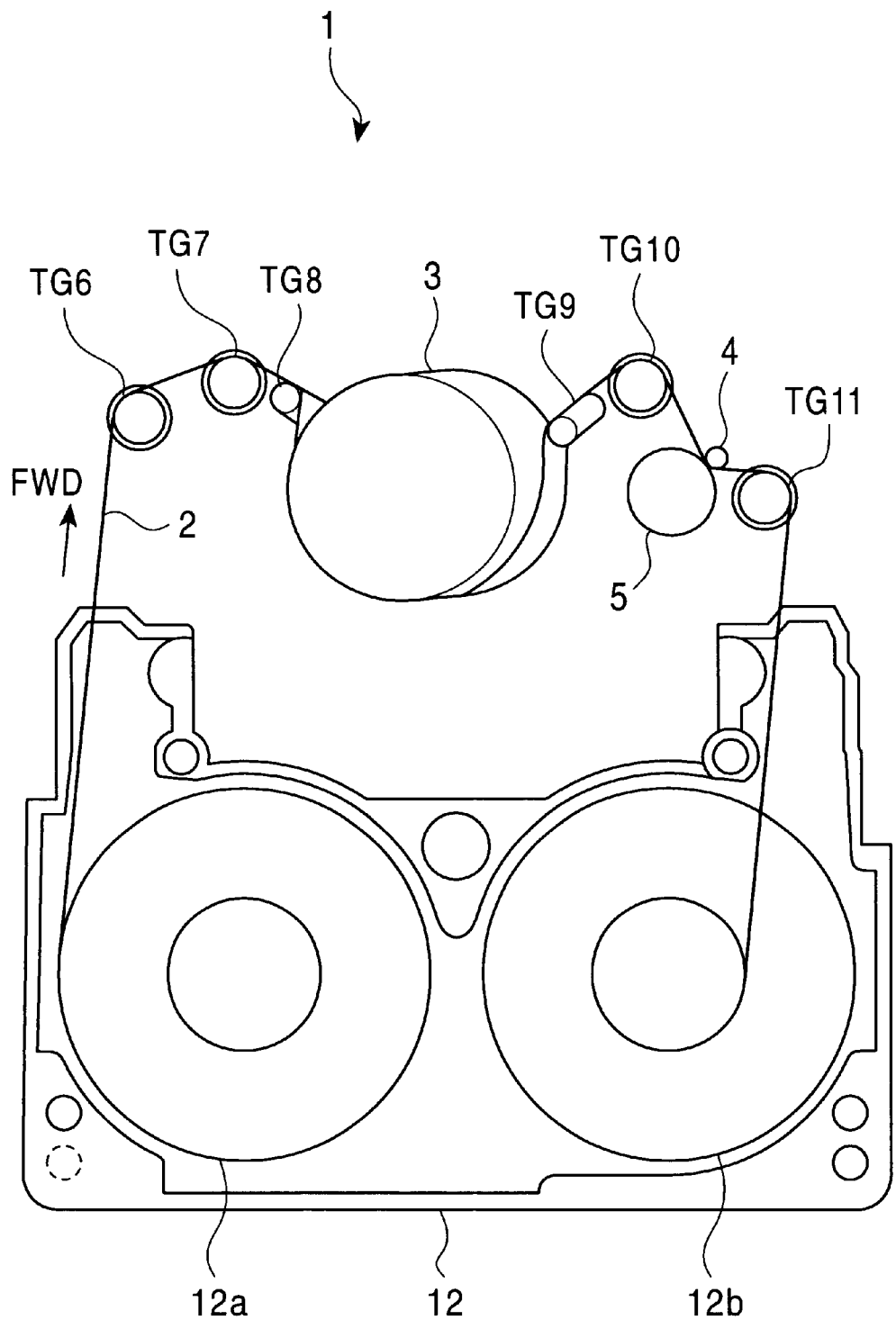
FIG. 3 is a schematic diagram showing the configuration of a magnetic recording/playback apparatus including a head drum device according to the present invention.

An embodiment of the present invention will be described below with reference to the accompanying drawings. FIG. 3 schematically illustrates the configuration of a magnetic recording/playback apparatus including a head drum device according to the present invention.

FIG. 3 illustrates a schematic diagram of a traveling system for a magnetic tape 2 in the magnetic recording/playback apparatus 1 in a recording or playback mode. The traveling system for the magnetic recording/playback apparatus 1 includes a head drum device 3 for performing either or both of writing and reading of a signal to and from the magnetic tape 2, a capstan 4 and a pinch roller 5 for making the magnetic tape 2 travel at a predetermined speed, and a plurality of tape guides (shown as TG in FIG. 3) 6 to 11 for assisting the magnetic tape 2 to travel. One example of this magnetic recording/playback apparatus 1 is a video tape recorder that records or plays back images and voice signals in digital form. A tape cassette 12 that is received in the magnetic recording/playback apparatus 1 includes a feed reel 12a and a take-up reel 12b for the magnetic tape 2.

While a recording or playback operation is performed, the magnetic tape 2 is led out in a direction FWD from the feed reel 12a by the force of the capstan 4, the pinch roller 5, and the take-up reel 12b, and is wound around the head drum device 3 via the tape guides 6, 7, and 8. The magnetic tape 2 can be wound around the head drum device 3 at a predetermined angle to perfrom writing and reading of signals with the rotatable magnetic head by mounting the tape guides 8 and 9 at a tilt and by providing a lead for guiding the magnetic tape 2 on the outer peripheral surface of the head drum device 3. The magnetic tape 2 is then wound around the take-up reel 12b via the tape guides 9 and 10, the capstan 4 and pinch roller 5, and the tape guide 11

Figure 1:
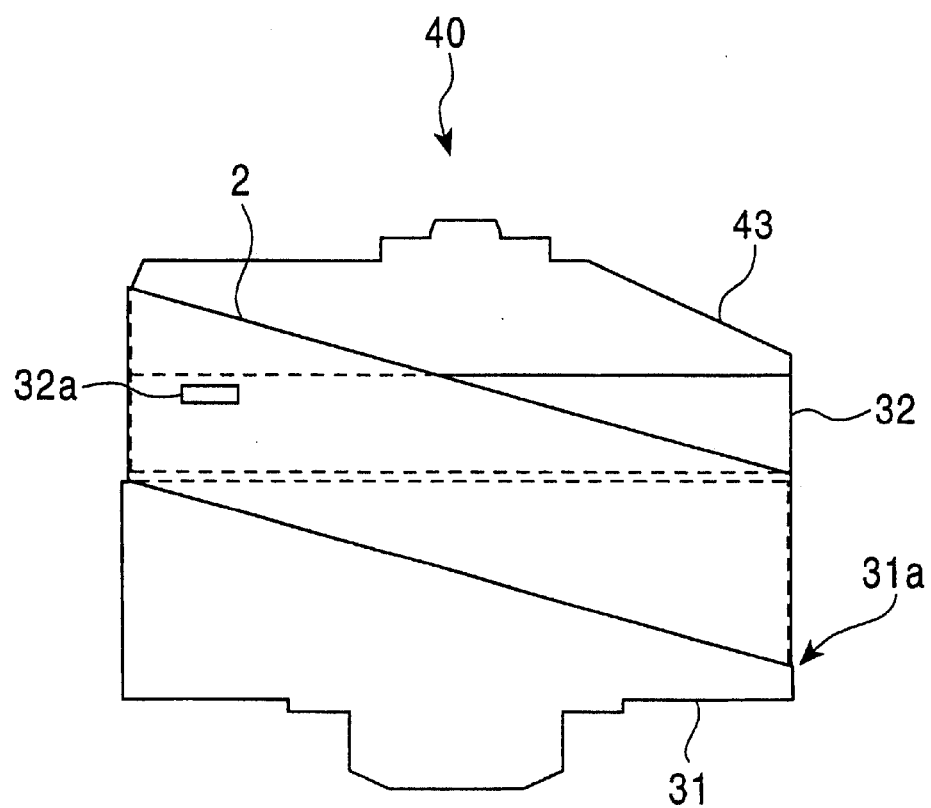
FIG. 1 illustrates an example of the configuration of a conventional three-layered head drum device.
Figure 2:
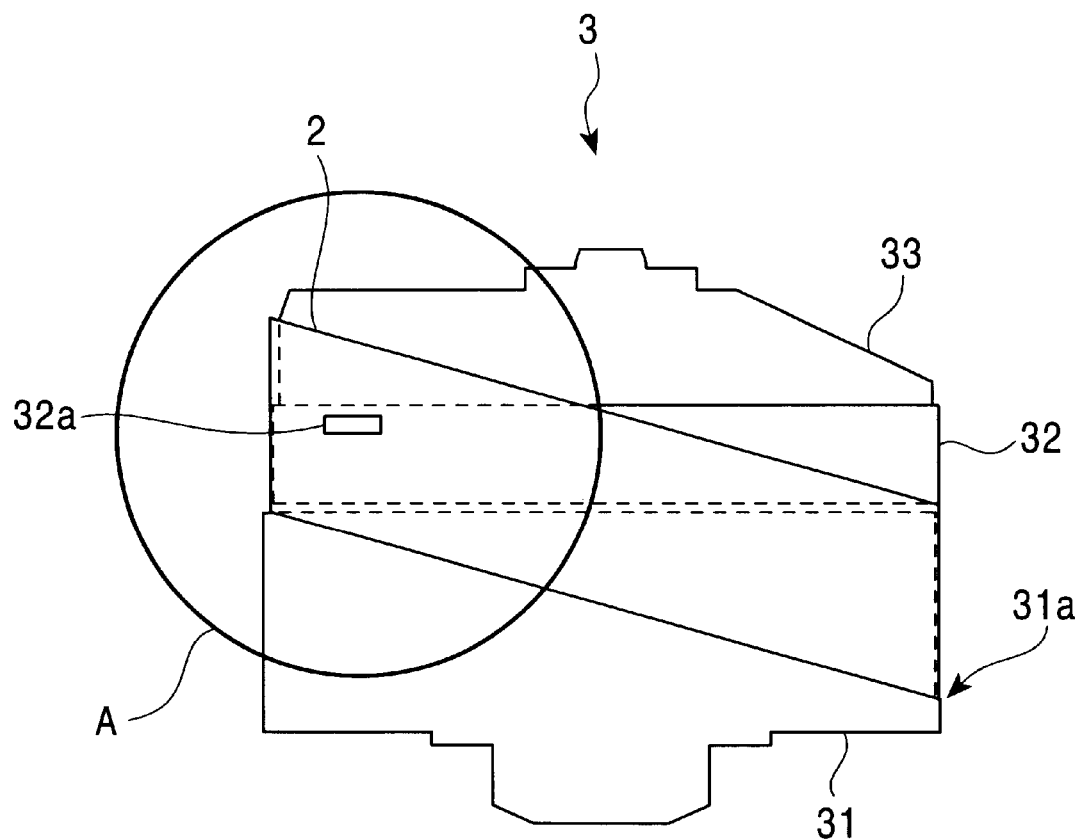
FIG. 2 is a schematic diagram showing the configuration of a head drum device according to the present invention.

Next, the head drum device 3 will be described in detail. FIG. 2 schematically illustrates the configuration of the head drum device 3 according to the present invention.

FIG. 2 is a side view of the head drum device 3 included in the magnetic recording/playback apparatus 1. The head drum device 3 has three layers, that is, a fixed lower drum 31, an intermediate drum 32 rotatable coaxially with the lower drum 31, and an upper drum 33 fixed coaxially with the intermediate drum 32. The lower drum 31 has a cylindrical circumference and is provided with a lead 31a for assisting the magnetic tape 2 to travel, which is helically wound around this circumference. A motor mechanism and associated parts (not shown) for rotating and driving the intermediate drum 32 are contained within the lower drum 31. On the other hand, the intermediate drum 32 has a cylindrical circumference with the same outside diameter as that of the circumference of the lower drum 31, on which magnetic heads 32a for performing writing and reading of a signal to and from the magnetic tape 2 are mounted. In practice, a plurality (two or four) of magnetic heads 32a is mounted on the circumference of the intermediate drum 32 and is rotated together with the intermediate drum 32. Further, the axial length of the intermediate drum 32 is smaller than the width of the magnetic tape 2. The upper drum 33 has a circumference that is a part of the cylindrical shape and is formed in such a manner that the radius of this circumference is smaller than that of the circumference of the intermediate drum 32. Also, a rotary transformer or the like (not shown) serving as a signal transmission path between the magnetic head 32a and an external device is accommodated within the upper drum 33.

While a recording or playback operation is performed on the magnetic tape 2 in such a head drum device 3, as shown in FIG. 2, the magnetic tape 2 is guided by the lead 31a and travels while being wound around the circumference of the head drum device 3 at a predetermined angle. At this time, the intermediate drum is rotated and the magnetic head 32a scans the magnetic tape 2 at an angle, thus performing writing and reading of signals. Further, as described above, because the axial length of the intermediate drum 32 is smaller than the width of the magnetic tape 2, the magnetic tape 2 travels while being wound around three layers, that is, the lower drum 31, the intermediate drum 32, and the upper drum 33.

In this head drum device 3, the upper drum 33 is made of a synthetic resin containing carbon. The fact that it contains carbon gives the upper drum 33 conductivity, thus suppressing electrostatic charge. In the magnetic recording/playback apparatus 1, the magnetic tape 2, for example, is likely to be charged with static electricity during use. If the upper drum 33 is charged with static electricity due to such a reason, the upper drum 33 and the magnetic tape 2 may cling together, thus hampering smooth travel of the magnetic tape 2. Meanwhile, because synthetic resins do not normally have conductivity, the present invention can avoid electrostatic charge by including carbon in the resin. Therefore, the value of the surface resistance of the upper drum 33 formed is usually 1015 Ω or less, and the carbon content is 10 percent by weight or more. Examples of synthetic resins that are used include polycarbonate, ABS (acrilonitrile-butadiene-styrene) resin, and POM (polyoxymethylene). A carbon content of 30 percent by weight may be optimal from the viewpoint of conductive performance and cost in currently distributed products.

In order to reduce manufacturing costs compared with conventional devices, the head drum device 3 using such materials is desirably manufactured only by means of injection molding without subsequent processing. However, since the manufacturing precision achieved by means of injection molding of the above-mentioned synthetic resin is around ±10–20 $\mu$m, the required level of manufacturing precision is not provided when the upper drum 33 and the intermediate drum 32 are formed so as to have the same diameter. Accordingly, in the head drum device 3 of the present invention, the upper drum 33 is formed in such a manner that its outside diameter is smaller than that of the intermediate drum 32. Thus, the present invention can realize reduced manufacturing cost by intentionally decreasing the outside diameter of the upper drum 33 so as to decrease the required manufacturing precision to the level available in injection molding of synthetic resin.

Figure 4:
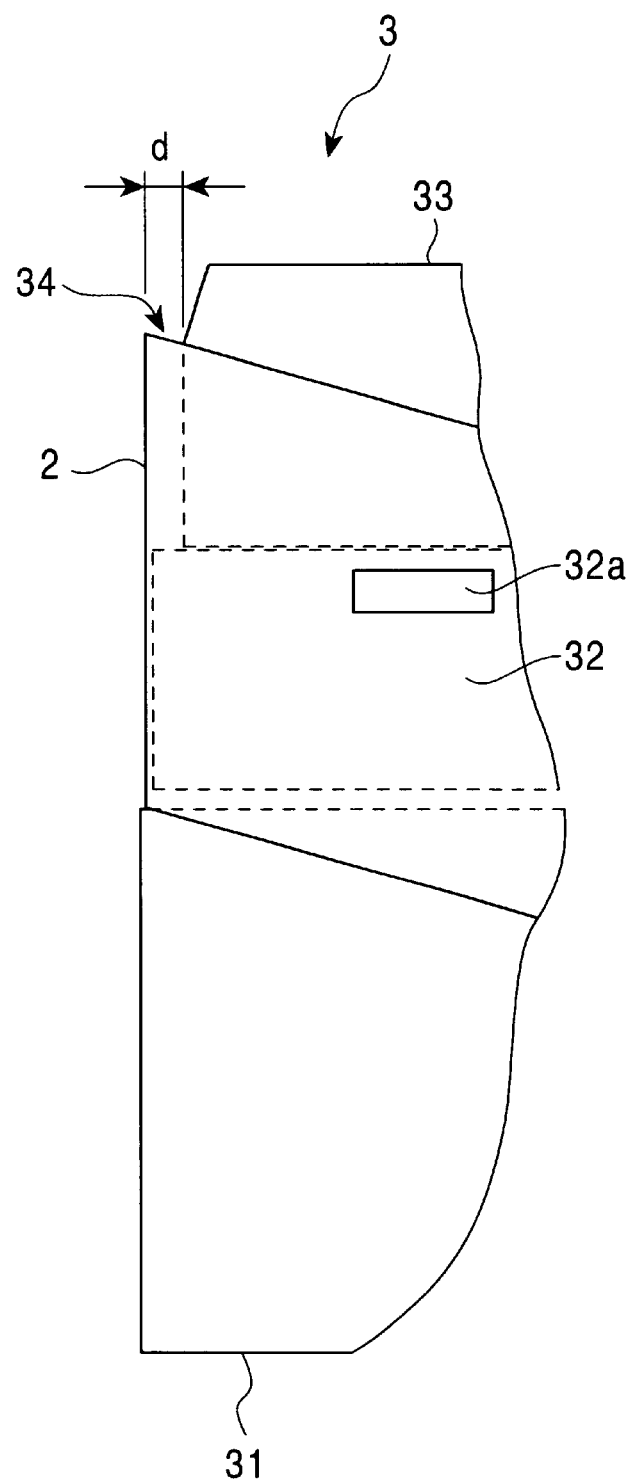
FIG. 4 is an enlarged view of the portion encircled by A in FIG. 2.

FIG. 4 is an enlarged view of the portion encircled by A in FIG. 2.

As shown in FIG. 4, while a recording or playback operation is performed on the magnetic tape 2 in the head drum device 3, traveling of the magnetic tape 2 and rotation of the intermediate drum 32 cause air to be sucked in between both the intermediate drum 32 and upper drum 33 and the magnetic tape 2 to form an air film 34. Further, the head drum device 3 is formed in such a manner that the outer peripheral surface of the upper drum 33 recedes inwardly from that of the intermediate drum 32 by the amount of a step d, that is, the radius of the circumference of the upper drum 33 is smaller than that of the intermediate drum 32 by the amount d.

On the other hand, any stains or dust attached on the surface of the upper drum 33 may attach onto the magnetic tape 2 during stopping or operating, which results in the magnetic tape 2 clinging to the head drum device 3, thereby causing obstruction of the travel of the magnetic tape 2. Such clinging of the magnetic tape 2 is likely to occur when the step d between the upper drum 33 and the intermediate drum 32 is 10 $\mu$m or less. Moreover, formation of the air film 34 mentioned above allows the magnetic tape 2 to travel smoothly and come into contact with the magnetic head 32a at an appropriate pressure. However, it is more desirable that the step d between the outer peripheral surface of the upper drum 33 and that of the intermediate drum 32 does not exceed 100 $\mu$m in order to sufficiently form the air film 34.

Therefore, an appropriate value of the step d is not less than 10 $\mu$m and preferably falls within the range from 10 to 100 $\mu$m. Considering the manufacturing precision of synthetic resin by injection molding, when the target value for the step d formed is set to around 50 to 60 $\mu$m, it becomes possible to easily form the upper drum 33 using synthetic resin materials containing carbon, as described above.

As described above, in the head drum device 3 of the present invention, use of synthetic resin with a carbon content of 10 percent by weight or more as the material of the upper drum 33 can prevent the head drum device 3 and the magnetic tape 2 from clinging together due to electrostatic charge, thus considerably reducing the cost of the material. Also, setting the radius of the outer peripheral surface of the upper drum 33 smaller than that of the intermediate drum 32 by an amount of 10 to 100 $\mu$m eliminates the need for a high-level of manufacturing precision in the manufacture of the upper drum 33. Moreover, such setting also can reduce the possibility that any stains or dust attached on the upper drum 33 may be transferred to the magnetic tape 2, so that the need for a process or mechanism for removing such stains or dust is eliminated. Thus, the upper drum 33 can be manufactured using the materials mentioned above by injection molding, so that the need for high-precision processing machines can be eliminated to reduce the cost of equipment and also the cost of manufacture.

Moreover, a device including the head drum device of the present invention is not limited to a video tape recorder. The present invention can be applied to all helical-scan-type magnetic recording apparatuses and magnetic playback apparatuses using a magnetic tape as a recording medium.

As described above, in the head drum device of the present invention, use of carbon-containing synthetic resin as the material of the upper drum can prevent the magnetic tape from clinging to the head drum device due to electrostatic charge. Also, setting the outside diameter of the upper drum smaller than that of the intermediate drum eliminates the need for a high-level of manufacturing precision in the manufacture of the upper drum. Thus, it is possible to reduce the manufacturing cost for the upper drum.

Also, in the magnetic recording/playback apparatus of the present invention, use of carbon-containing synthetic resin as the material of the upper drum of the head drum device can prevent the magnetic tape from clinging to the head drum device due to electrostatic charge. Also, setting the outside diameter of the upper drum smaller than that of the intermediate drum eliminates the need for a high-level of manufacturing precision in the manufacture of the upper drum. Thus, it is possible to reduce the manufacturing cost for the upper drum.

What is claimed is:

1. In a head drum device for performing either or both writing and reading of a signal to and from a magnetic tape, said head drum device is characterized by comprising:

a fixed lower drum including a lead for helically-guiding said magnetic tape;

an intermediate drum including a magnetic head on the outer peripheral surface thereof, which is rotated and supported coaxially with said lower drum and is formed in such a manner that the axial length of said outer peripheral surface is smaller than the width of said magnetic tape; and an upper drum made of a synthetic resin containing carbon, which is fixed and supported coaxially with said intermediate drum; wherein the outside diameter of said upper drum is smaller than that of said intermediate drum; and the value of the surface resistance of said upper drum is 1015 Ω or less.

2. The head drum device according to claim 1, characterized in that the circumference of said upper drum differs in radius from that of said intermediate drum by an amount of 10 μm or more.

3. The head drum device according to claim 1, characterized in that the carbon content of said synthetic resin is 10 percent or more by weight.

4. The head drum device according to claim 1, characterized in that the circumference of said upper drum differs in radius from that of said intermediate drum by an amount that falls within the range of 10 to 100 μm.

5. The head drum device according to claim 1, characterized in that the circumference of said upper drum differs in radius from that of said intermediate drum by an amount that falls within the range of 50 to 60 μm.

6. In a magnetic recording/playback apparatus for performing either or both recording and playback of a signal on a magnetic tape, said magnetic recording/playback apparatus is characterized by having a head drum device comprising:

a fixed lower drum including a lead for helically guiding said magnetic tape;

an intermediate drum including a magnetic head on the outer peripheral surface thereof, which is rotated and supported coaxially with said lower drum and is formed in such a manner that the axial length of said outer peripheral surface is smaller than the width of said magnetic tape; and an upper drum made of a synthetic resin containing carbon, which is fixed and supported coaxially with said intermediate drum; wherein the outside diameter of said upper drum is smaller than that of said intermediate drum; and the value of the surface resistance of said upper drum is 1015 Ω or less.

7. The magnetic recording/playback apparatus according to claim 6, characterized in that the circumference of said upper drum differs in radius from that of said intermediate drum by an amount of 10 μm or more.

8. The magnetic recording/playback apparatus according to claim 6, characterized in that the carbon content of said synthetic resin is 10 percent or more by weight.

9. The magnetic recording/playback apparatus according to claim 6, characterized in that the circumference of said upper drum differs in radius from that of said intermediate drum by an amount that falls within the range of 10 to 100 μm.

10. The magnetic recording/playback apparatus according to claim 6, characterized in that the circumference of said upper drum differs in radius from that of said intermediate drum by an amount that falls within the range of 50 to 60 μm.

* * * * *